(12) United States Patent
Nakamura et al.

(10) Patent No.: US 7,115,328 B2
(45) Date of Patent: Oct. 3, 2006

(54) MASTER DISK FOR TRANSFERRING MAGNETIC PATTERN AND MAGNETIC RECORDING MEDIUM

(75) Inventors: Yutaka Nakamura, Kawasaki (JP); Hitoshi Komoriya, Kawasaki (JP); Hiroyuki Suzuki, Kawasaki (JP); Takao Hirahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 540 days.

(21) Appl. No.: 10/126,109

(22) Filed: Apr. 19, 2002

(65) Prior Publication Data
US 2003/0113503 A1   Jun. 19, 2003

(30) Foreign Application Priority Data
Dec. 14, 2001   (JP)   ............... 2001-381324

(51) Int. Cl.
*G11B 5/86* (2006.01)
(52) U.S. Cl. ............ 428/826; 428/848.5; 360/16
(58) Field of Classification Search ............ None
See application file for complete search history.

(56) References Cited

U.S. PATENT DOCUMENTS 6,858,328 B1 * 2/2005 Ishida et al. ............ 428/694 T 2002/0051307 A1   5/2002 Nishikawa et al.
2002/0150794 A1  10/2002 Hamada et al.

FOREIGN PATENT DOCUMENTS

| JP | 10-162361 | 6/1998 |
| JP | 10-275435 | 10/1998 |
| JP | 2000-339681 A | * 12/2000 |
| JP | 2002-008230 | 1/2002 |
| JP | 2002-074655 | 3/2002 |
| JP | 2002-298341 | 10/2002 |

OTHER PUBLICATIONS

JPO Abstract Translation of JP 2000-339681 A.*
Machine Translation of JP 2000-339681-A.*
English Translation of JP 12-339681 A (PTO 05-1819).*

* cited by examiner

*Primary Examiner*—Kevin M. Bernatz
(74) *Attorney, Agent, or Firm*—Greer, Burns & Crain, Ltd.

(57) ABSTRACT

The present invention provides a master disk that can easily be brought into contact with and separated from a magnetic recording medium, and can accommodate foreign matters. This master disk transfers a predetermined magnetic pattern onto a magnetic recording medium that can record magnetic information. In the master disk, there are a magnetic pattern formation region in which the magnetic pattern is formed, and a blank region in which the magnetic pattern is not formed. A concave portion for accommodating foreign matters is formed in at least one part of the blank region.

5 Claims, 9 Drawing Sheets

MASTER DISK FOR TRANSFERRING MAGNETIC PATTERN AND MAGNETIC RECORDING MEDIUM

BACKGROUND OF THE INVENTION

The present invention generally relates to master disks for transferring magnetic patterns and magnetic recording media, and, more particularly, to a master disk for transferring a predetermined magnetic pattern onto a magnetic recording medium, such as a magnetic disk, mounted on a magnetic recording device generally employed as an external memory of a computer.

In recent years, magnetic recording devices have larger capacities and higher recording densities. With this trend, there is an increasing demand for reasonably priced magnetic recording media with large capacities that can record a larger volume of information and can shorten the access time for reproduction. To realize such a large-capacity magnetic recording medium, a so-called tracking servo technique has been conventionally employed so that a magnetic head can accurately perform a scanning operation on narrow tracks.

In a large-capacity magnetic recording medium, a magnetic pattern according to a signal such as a tracking servo signal is "pre-formatted" at certain intervals in each one circle on a magnetic disk, for instance. A magnetic head reads the magnetic pattern, and then corrects the position of the magnetic head itself so as to perform a scanning operation on the tracks with high precision.

In the prior art, a magnetic recording medium having the above magnetic pattern is produced by performing a recording operation on each one track of each one disk, using a servo information recording device designed specially for magnetic recording media. Such a servo information recording device requires a mechanism for positioning a recording head with high precision, and therefore is expensive. Furthermore, a longer time is required for recording a magnetic pattern on a magnetic recording medium having a larger capacity. As a result, the magnetic pattern recording procedure takes a large proportion of the entire production process for producing the large-capacity magnetic recording medium, and leads to a higher production cost.

To solve the above problems, a technique for transferring a magnetic pattern onto a magnetic recording medium from a disk (or a "master disk") having magnetic layers patterned in accordance with the magnetic pattern has been suggested, instead of the conventional technique of recording a magnetic pattern onto each one track.

According to this transfer technique using the master disk, the magnetic body is brought into contact with a magnetic recording medium to be pre-formatted, so that the magnetic layers are excited by an external magnetic field supplied to the magnetic recording medium. In this manner, a magnetic recording medium having a predetermined magnetic pattern can be produced in a short time. Thus, the production procedures can be simplified, and the production costs can be lowered.

FIG. 1 shows a magnetic pattern transfer device 100 that employs a conventional master disk. A master disk 110 is placed on a magnetic recording medium 120, and a magnetic field 105 is supplied from a magnet 101 that serves as a magnetic field generator. The master disk 110 has magnetic layers 111 at locations corresponding to a magnetic pattern predetermined by a signal such as a servo signal. In FIG. 1, the magnetic layers 111 are excited by the magnetic field 105, and, as a result, the pattern formed by the magnetic layers 111 is transferred as a transferred pattern 121 onto the magnetic recording medium 120.

In the magnetic pattern transfer device 100 shown in FIG. 1, the magnetic layers 111 of the master disk 110 are brought toward the recording medium 120 close enough to supply the magnetic field 105, so that the magnetic pattern in the magnetic body 110 can be transferred onto the magnetic recording medium 120 with high precision. To achieve this, it is essential that the lower surface 110A of the master disk 110 should be tightly brought into contact with the upper surface 120A of the magnetic recording medium 120.

The lower surface 110A of the conventional master disk 110 to be brought into contact with the magnetic recording medium 120 is flat, and generally so is the upper surface 120A of the magnetic recording medium 120. Because of this, when a foreign matter DAS exists between the master disk 110 and the magnetic recording medium 120, as shown in FIG. 2, the contact between the master disk 110 and the magnetic recording medium 120 cannot be good enough to achieve precise pattern transfer.

Generally, it is difficult to achieve contact between two flat surfaces, with air or moisture existing in between. On the other hand, once two flat surfaces are brought into contact, it also becomes difficult to separate the two flat surfaces from each other, due to the surface tension of the air or moisture.

SUMMARY OF THE INVENTION

A general object of the present invention is to provide master disks for transferring magnetic patterns and magnetic recording media in which the above disadvantages are eliminated.

A more specific object of the present invention is to provide a master disk that can be brought into contact with a magnetic recording medium onto which a magnetic pattern is to be transferred, even with a foreign matter existing in between, and that can also be easily separated from the magnetic recording medium.

The above objects of the present invention are achieved by a magnetic-pattern transfer master disk for transferring a predetermined magnetic pattern onto a magnetic recording medium that can record magnetic information. This master disk includes: a magnetic pattern region in which the magnetic pattern is formed; and a blank region in which the magnetic pattern is not formed. In this master disk, a concave portion is formed in at least one part of the blank region.

Since the concave portion formed in the master disk can accommodate foreign matters, a surface on which the magnetic pattern is formed can be brought into contact with a magnetic recording medium, without any trouble caused by the foreign matters.

The above objects of the present invention are also achieved by a magnetic recording medium that has a magnetic pattern transferred thereto by the magnetic-pattern transfer master disk.

With such a magnetic recording medium, an accurate magnetic pattern can be pre-formatted, and high-precision scanning can be performed with a magnetic head.

The above and other objects and features of the present invention will become more apparent from the following description taken in conjunction with the accompanying drawings.

DESCRIPTION OF THE PREFERRED EMBODIMENTS

The present invention solves the problems of the prior art by providing a structure in which concave portions are formed on one of two flat surfaces to be brought into contact with each other. More specifically, a magnetic pattern to be transferred is not formed on the entire lower surface of the master disk, but only in magnetic-pattern formation regions on the lower surface of the master disk. In this master disk, regions in which the magnetic pattern is not formed (hereinafter referred to as "blank region") occupy a larger area than the magnetic-pattern formation regions. The concave portions are formed in the blank region, so as to accommodate foreign matters existing between the master disk and the magnetic recording medium. Since the blank regions occupy a large area in the master disk, foreign matters can be accommodated in the concave portions formed in the blank regions. Accordingly, adverse influence of foreign matters can be effectively eliminated from the magnetic transfer operation between the master disk and the magnetic recording medium.

The following is a description of more specific embodiments of the present invention, with reference to the accompanying drawings.

Figure 1:
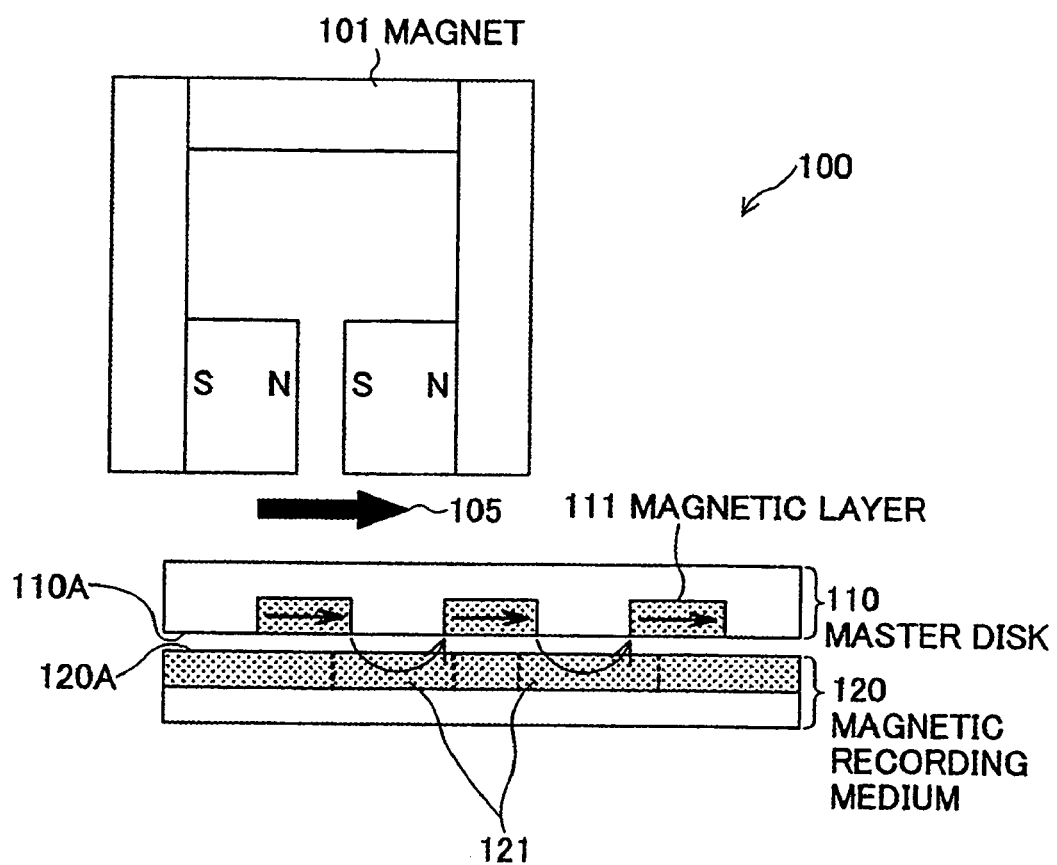
FIG. 1 shows an example of a magnetic pattern transfer device that employs a conventional master disk.
Figure 2:
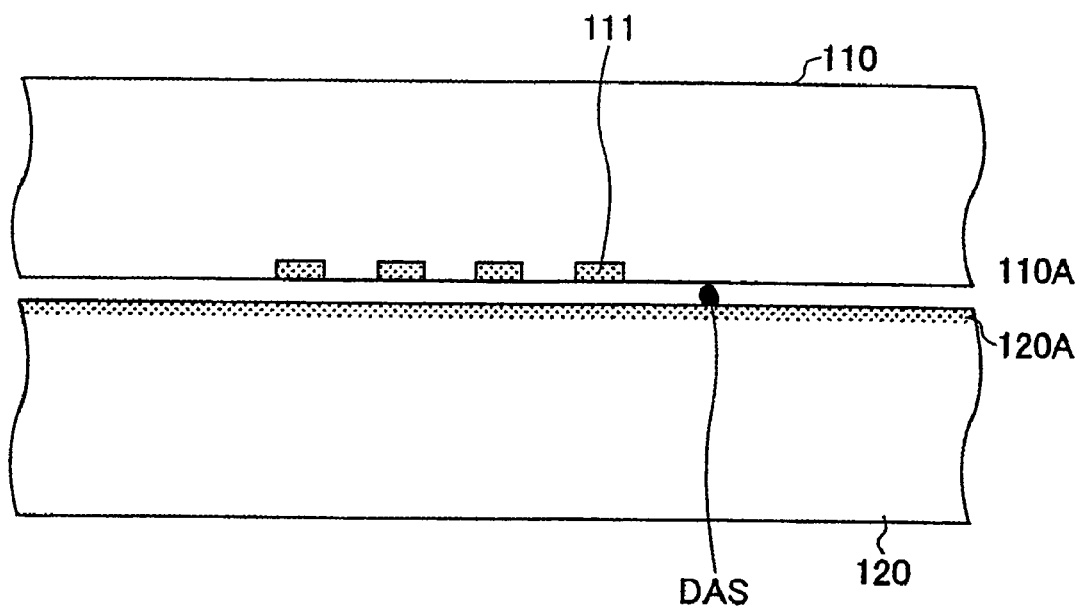
FIG. 2 shows a situation where a foreign matter DAS exists between the conventional master disk and a magnetic recording medium.
Figure 3:
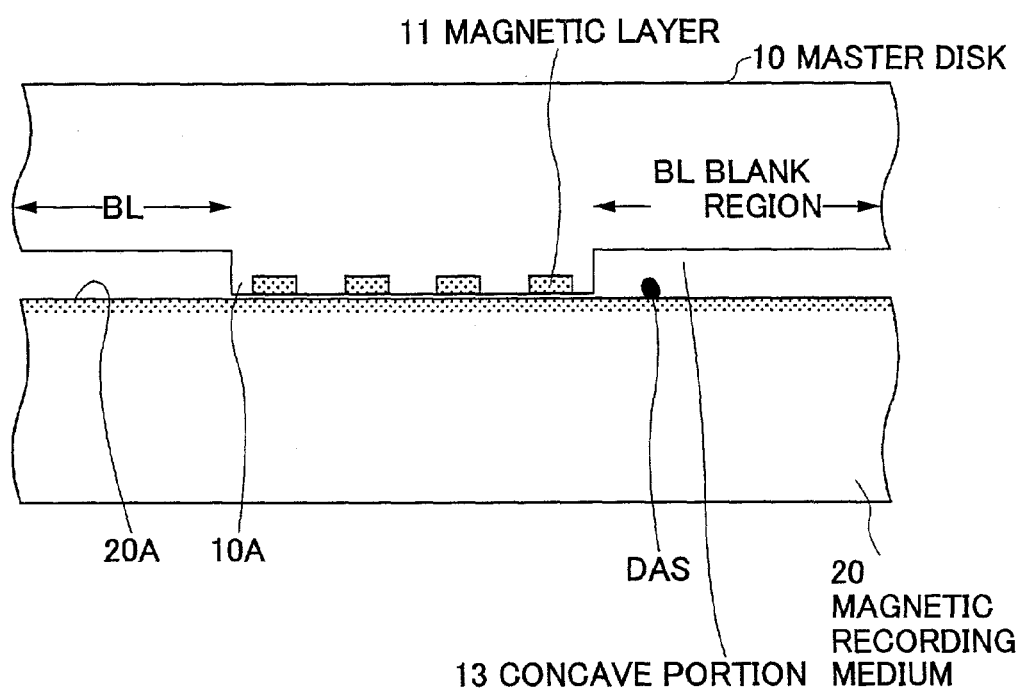
FIG. 3 is an enlarged view of a master disk in accordance with a first embodiment of the present invention.

FIG. 3 schematically shows an example of the structure of a master disk 10 in accordance with a first embodiment of the present invention. In FIG. 3, one track of the master disk 10 is seen from one side, and the master disk 10 is in contact with a magnetic recording medium 20, with a foreign matter DAS existing in between.

The master disk 10 of this embodiment has blank regions BL as concave portions 13 in which magnetic layers 11 do not exist. The magnetic layers 11 are formed in a pattern corresponding to a magnetic pattern.

Since the blank regions BL occupy a greater area than the magnetic pattern regions in which the magnetic layers 11 exist, the chances are greater that a minute foreign matter DAS exists in one of the blank regions BL. By turning the blank regions BL into the concave portions 13, the possibilities of failing to bring the master disk 10 into contact with the magnetic recording medium 20 due to a foreign matter DAS can be reduced.

With the concave portions 13, the lower surface of the master disk 10 provided with the magnetic layers 11 can be easily brought into contact with and separated from the upper surface 20A of the magnetic recording medium 20. Accordingly, the problems in bringing two large flat surfaces into contact with each other and separating from each other are not caused.

If the blank regions BL are formed by small blanks scattered over the master disk, each of the blanks should be provided with one of the concave portions 13. If each of the blank regions BL is formed by a large-area blank, each of the blanks should be provided with a plurality of concave portions 13.

The master disk 10 of this embodiment can be produced by a lithography technique that is employed in various technical fields such as semiconductor production. More specifically, for instance, a photoresist is applied to a substrate made of $SiO_2$ or the like. An exposure process, a developing process, and an etching process are then conducted on the substrate, using a photomask formed in accordance with the magnetic pattern. A soft magnetic material is sputtered onto the resultant, so as to form the magnetic layers 11. The concave portions 13 can also be formed during the etching process. In this manner, the master disk 10 of this embodiment can be produced through conventional procedures.

Figure 4:
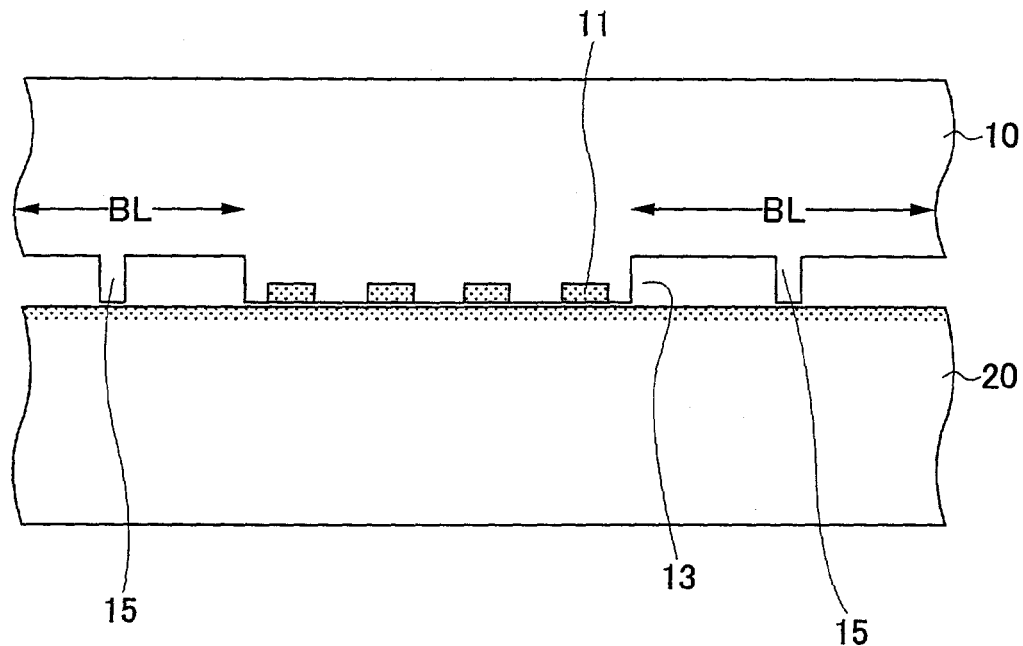
FIG. 4 is an enlarged view of a master disk in accordance with a second embodiment of the present invention.

FIG. 4 schematically shows an example of the structure of a master disk in accordance with a second embodiment of the present invention. In the description of the second embodiment, the same components as in the first embodiment are denoted by the same reference numerals as in FIG. 3, and explanation for those components will be omitted. This applies to the other embodiments that follow.

In the second embodiment, a beam-like reinforcing member 15 that extends in the radial direction of each of the concave portions 13 is added to the structure of the first embodiment. When a magnetic pattern is transferred, an external force is applied so as to bring the master disk 10 into contact with the magnetic recording medium 20. At this point, the master disk 10 might be deformed because of the large-area concave portions 13. To avoid such deformation in the master disk 10, the beam-like reinforcing member 15 is provided in each of the concave portions 13 in this embodiment.

Figure 5:
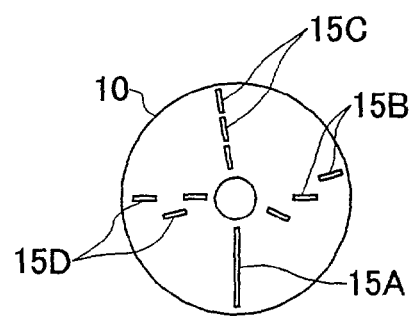
FIG. 5 illustrates examples of the arrangement of beam-like reinforcing members in concave portions of the master disk.

The width or length of the beam-like reinforcing member 15 should be suitably adjusted to the shape of the corresponding one of the concave portions 13. FIG. 5 shows examples of the arrangement of the beam-like reinforcing members 15 in the concave portions 13 of the master disk 10. As shown with reference numerals 15A in FIG. 5, each reinforcing member 15 may be one long beam-like reinforcing member. Alternatively, as shown with reference numerals 15B through 15D, the reinforcing members may have divided forms. Although not shown in the drawing, the beam-like reinforcing members 15 are not necessarily linear members, but can be curved members.

Figure 6:
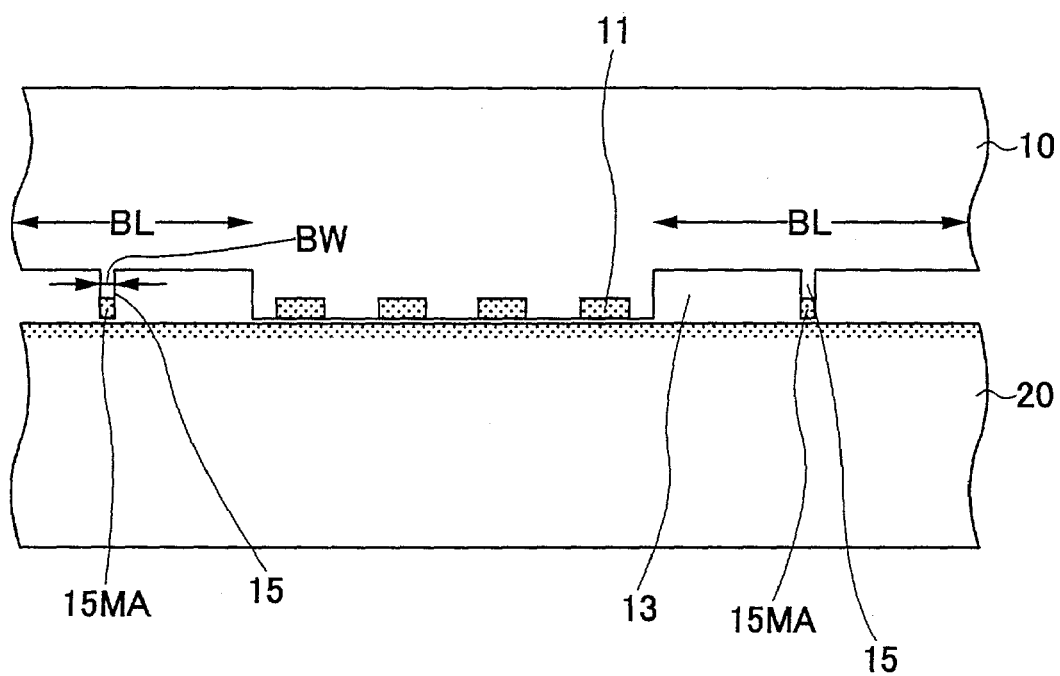
FIG. 6 is an enlarged view of a master disk in accordance with a third embodiment of the present invention.
Figure 7:
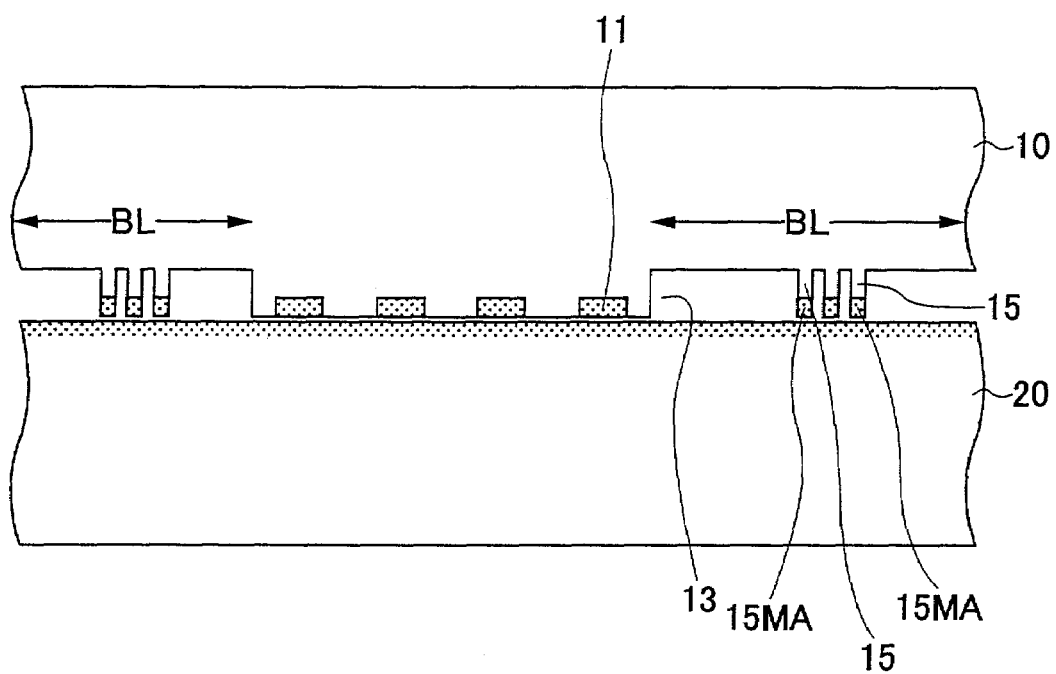
FIG. 7 shows another example of the master disk in accordance with the third embodiment of the present invention.

FIGS. 6 and 7 schematically show examples of the structure of a master disk in accordance with a third embodiment of the present invention. In the third embodiment, a correcting procedure is added to the process of producing the master disk 10 of the second embodiment, so that a magnetic portion 15MA formed at the end of each of the beam-like reinforcing members 15 can be corrected. In this manner, the magnetic portions 15MA cannot adversely affect the original magnetic pattern.

As described above, the master disk 10 can be produced by a conventional thin-film formation technique. There can be various combinations of procedures based on several thin-film formation techniques. For instance, the surface of a master substrate is subjected to etching in accordance with the magnetic pattern, and a soft magnetic material can be formed on the etched surface by sputtering. In this case, the beam-like reinforcing members 15 can be simultaneously formed, without causing the formation of a magnetic part on the end of each of the beam-like reinforcing members 15.

However, where the etching is performed after the soft magnetic material is formed on the entire substrate surface, the problem of magnetic parts arises. To simplify the production procedures, the beam-like reinforcing members 15 are integrally formed by etching. In doing so, a magnetic part remains on the front end of each of the beam-like reinforcing members 15. Such a magnetic part is transferred together with the original magnetic pattern onto the magnetic recording medium 20.

To solve this problem, the master disk 10 of the third embodiment shown in FIG. 6 have a smaller beam width BW for each of the beam-like reinforcing members 15, so as to restrict unnecessary transfer of the magnetic parts MA onto the magnetic recording medium 20. Here, the beam width BW of each of the beam-like reinforcing members 15 should preferably be not smaller than a half the width of the magnetic pattern.

FIG. 7 shows another example of the structure of the master disk in accordance with the third embodiment, where a set of three thin beam-like reinforcing members 15 adjacent to one another is set in each of the concave portions 13. When a plurality of thin beam-like reinforcing members 15 are arranged in the vicinity of one another as in this example, the pressure concentration onto the thin beam-like reinforcing members 15 is reduced, and the concave portions 13 are suitably reinforced while the adverse influence of the magnetic parts 15MA is restricted. The thin beam-like reinforcing members 15 shown in FIG. 7 should preferably be arranged in an area wider than each of the beam-like reinforcing members shown in FIG. 4, at regular intervals that are substantially equal to the widths of the thin beam-like reinforcing members 15.

In the following embodiments shown in FIGS. 8 through 11, the beam-like reinforcing members 15 used in the foregoing embodiments are replaced by pillar-like reinforcing members 16 scattered in the concave portions 13.

Figure 8:
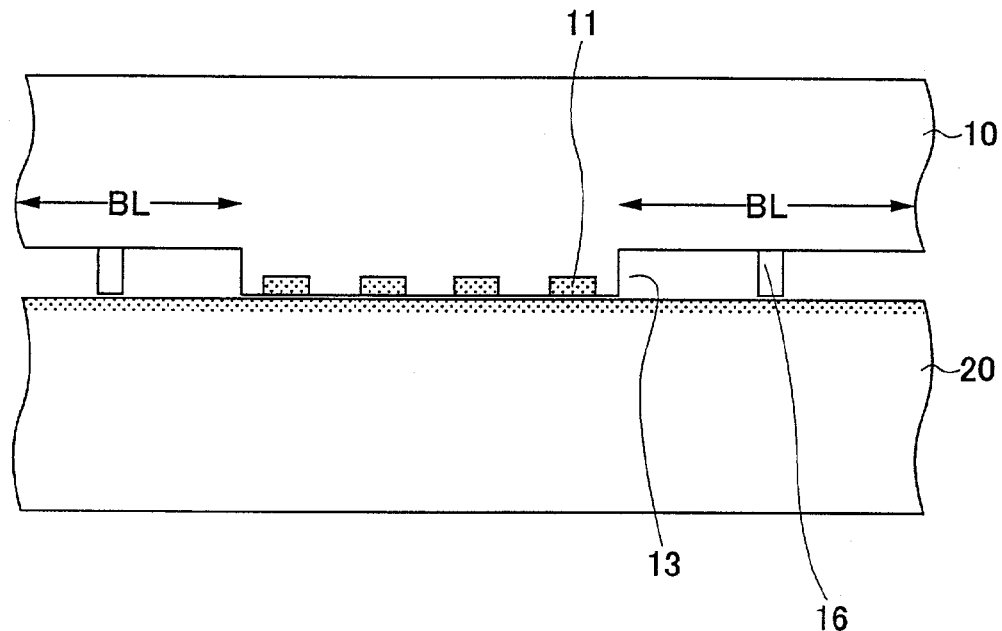
FIG. 8 is an enlarged view of a master disk in accordance with a fourth embodiment of the present invention.
Figure 9:
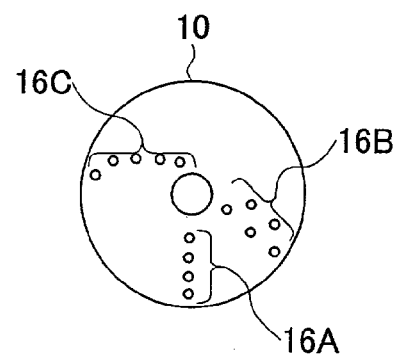
FIG. 9 shows examples of the arrangement of pillar-like reinforcing members in the concave portions of the master disk.

FIG. 8 schematically shows an example of the structure of a master disk in accordance with a fourth embodiment of the present invention. In the fourth embodiment, pillar-like reinforcing members 16 are arranged in the concave portions so as to prevent deformation of the concave portions 13. The diameter of each of the pillar-like reinforcing members 16 and the total number of the pillar-like reinforcing members 16 should be suitably adjusted to the shape of each of the concave portions 13. FIG. 9 shows examples of the arrangement of the pillar-like reinforcing members 16 in the concave portions 13. As shown with reference numeral 16A in FIG. 9, the pillar-like reinforcing members 16 can be linearly arranged in the radial direction of the master disk 10. Alternatively, as shown with reference numerals 16B and 16C, the pillar-like reinforcing members 16 can be arranged in a zigzag or gradually shifted from one another. Although not shown in the drawing, the pillar-like reinforcing members 16 may have different diameters.

Figure 10:
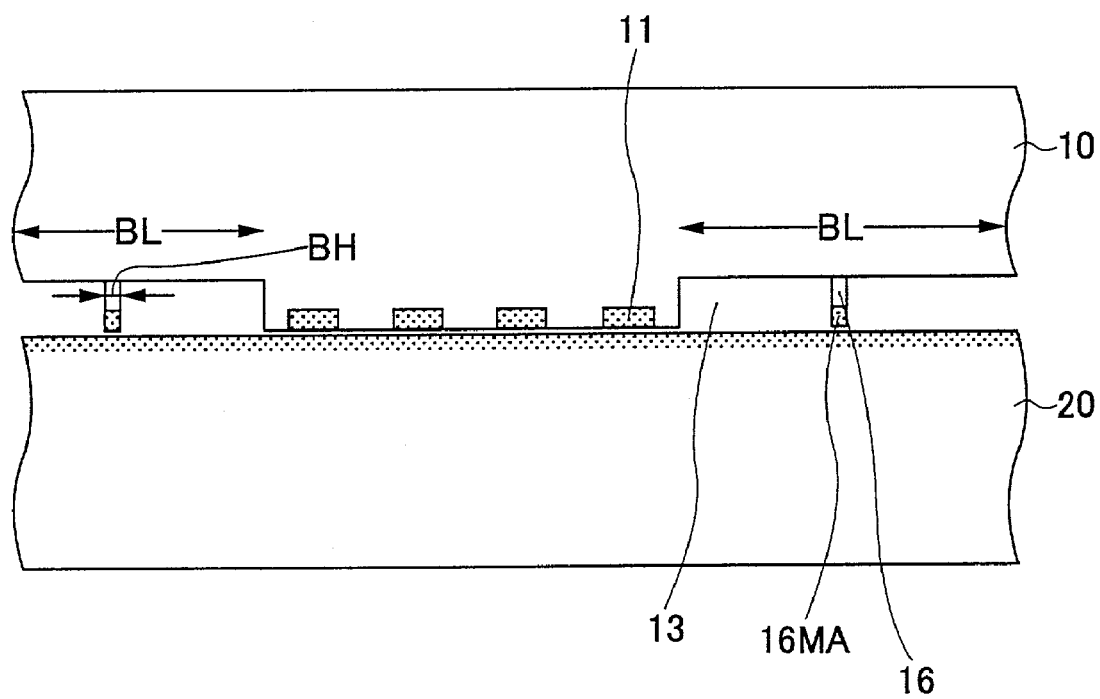
FIG. 10 is an enlarged view of a master disk in accordance with a fifth embodiment of the present invention.
Figure 11:
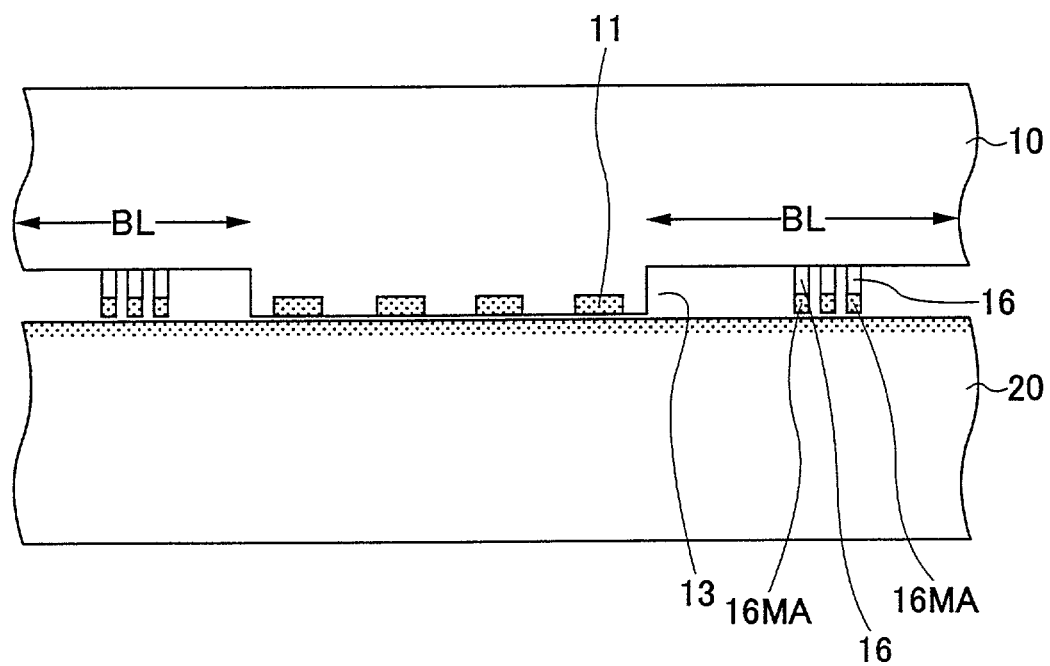
FIG. 11 shows another example of the master disk in accordance with the fifth embodiment of the present invention.

FIGS. 10 and 11 schematically show examples of the structure of a master disk in accordance with a fifth embodiment of the present invention. In the fifth embodiment, as in the third embodiment, a correcting procedure for correcting a magnetic part 16MA formed at the end of each of the pillar-like reinforcing members 16 is added to the production process of the master disk 10.

The master disk 10 of the fifth embodiment shown in FIG. 10 has a smaller diameter HW for each of the pillar-like reinforcing members 16 so as to prevent unnecessary transfer of the magnetic parts 16MA onto the magnetic recording medium 20. Here, the pillar diameter HW should preferably be not smaller than a half the width of the magnetic pattern.

FIG. 11 shows an example of the arrangement, where a set of thin pillar-like reinforcing members 16 adjacent to one another is set in each of the concave portions 13. By arranging a plurality of thin pillar-like reinforcing members 16 in the vicinity of one another, the pressure concentration onto the thin pillar-like reinforcing members 16 is reduced, and the concave portions 13 are suitably reinforced while adverse influence of the magnetic parts 16MA are restricted A set of the thin pillar-like reinforcing members 16 shown in FIG. 11 should preferably be arranged in an area wider than the diameter of each of the pillar-like reinforcing members shown in FIG. 8, at regular intervals that are substantially equal to the widths of the thin pillar-like reinforcing members 16.

Although the pillar-like reinforcing members 16 in the fourth and fifth embodiments are cylindrical pillars, they may have elliptic sections or may be prisms. Furthermore, the beam-like reinforcing members and the pillar-like reinforcing members may be employed together.

The master disk 10 described so far can be used not only for servo signal transfer, but also for transferring address signals, reproduction clock signals, or data, onto a magnetic recording medium in advance.

It should be noted that the present invention is not limited to the embodiments specifically disclosed above, but other variations and modifications may be made without departing from the scope of the present invention.

What is claimed is:

1. A magnetic-pattern transfer master disk for transferring a predetermined magnetic pattern onto a magnetic recording medium that can record magnetic information, said wherein a surface of the master disk facing the recording medium during the transfer operation comprises:

magnetic pattern regions in which magnetic layers are formed; and blank regions in which the magnetic layers are not formed, wherein said blank regions form concave portions relative to said magnetic pattern regions, said blank regions having a larger combined surface area than said magnetic pattern regions, and wherein said blank regions are adjacent to said magnetic regions, and upon performing a magnetic transfer operation between said master disk and said recording medium, of said blank regions and said magnetic pattern regions, only said magnetic pattern regions contact the surface of the magnetic recording medium.

2. The magnetic-pattern transfer master disk as claimed in claim 1, wherein a reinforcing member for reinforcing the concave portion is provided in the concave portion.

3. The magnetic-pattern transfer master disk as claimed in claim 2, wherein the reinforcing member is formed as a beam that extends in a width direction of the concave portion or pillars scattered in the concave portion.

4. The magnetic-pattern transfer master disk as claimed in claim 3, wherein a plurality of the reinforcing members, which form beams and have widths that are smaller than a magnetic pattern width, are arranged at predetermined intervals.

5. The magnetic-pattern transfer master disk as claimed in claim 3, wherein a plurality of the pillars have a diameter smaller than a magnetic pattern width and are arranged at predetermined intervals.

* * * * *

UNITED STATES PATENT AND TRADEMARK OFFICE
CERTIFICATE OF CORRECTION

| | |
|---|---|
| PATENT NO. | : 7,115,328 B2 |
| APPLICATION NO. | : 10/126109 |
| DATED | : October 3, 2006 |
| INVENTOR(S) | : Nakamura et al. |

Page 1 of 1

It is certified that error appears in the above-identified patent and that said Letters Patent is hereby corrected as shown below:

In the Claims:

Col. 6, Claim 1 line 46, delete "said".

Signed and Sealed this

Tenth Day of April, 2007

JON W. DUDAS
*Director of the United States Patent and Trademark Office*